US008601203B2

(12) United States Patent
Holbrook et al.

(10) Patent No.: US 8,601,203 B2
(45) Date of Patent: Dec. 3, 2013

(54) FIRMWARE FLASHING OF A PORTABLE DEVICE USING A SERIAL BUS HUB

(75) Inventors: Richard W. Holbrook, Phoenix, AZ (US); Jesse R. Lyles, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 618 days.

(21) Appl. No.: 12/765,233

(22) Filed: Apr. 22, 2010

(65) Prior Publication Data

US 2011/0225349 A1    Sep. 15, 2011

Related U.S. Application Data

(60) Provisional application No. 61/313,350, filed on Mar. 12, 2010.

(51) Int. Cl.
*G06F 12/00* (2006.01)
*G06F 13/00* (2006.01)
*G06F 13/28* (2006.01)
*G06F 9/44* (2006.01)

(52) U.S. Cl.
USPC ............................ 711/103; 711/154; 717/168

(58) Field of Classification Search
USPC .................................................. 711/103, 154
See application file for complete search history.

(56) References Cited

U.S. PATENT DOCUMENTS

2005/0060699 A1* 3/2005 Kim et al. ...................... 717/168
2009/0222807 A1* 9/2009 Fu et al. ......................... 717/168

OTHER PUBLICATIONS

"SMSC Integrates USB 2.0 Flash Media Reader and Hub Controller", Oct. 13, 2008, Bloomberg.com (http://www.bloomberg.com/apps/news?pid=newsarchive&sid=anMHDSqe02Ps).*
Eva Murphy and Padraig Fitzgerald; "Switching in USB Consumer Applications"; Analog Dialogue 40-02, Jan. 2006; 7 pages.

* cited by examiner

*Primary Examiner* — Alford W. Kindred
*Assistant Examiner* — Rocio Del Mar Perez-Velez
(74) *Attorney, Agent, or Firm* — King & Spalding L.L.P.

(57) ABSTRACT

System and method for configuring a portable device. The portable device includes a serial bus hub, one or more processors coupled to the serial bus hub via a serial bus, and a flash memory coupled to the serial bus hub via the serial bus. A degraded signal is received to a serial bus hub included in the portable device via a serial bus, where the degraded signal includes code to be written to the flash memory to initialize or update firmware for the portable device. The serial bus hub restores the degraded signal, thereby generating a restored signal, and sends the restored signal to at least one of the one or more processors to initialize or update the firmware in the flash memory for the portable device.

20 Claims, 6 Drawing Sheets

FIRMWARE FLASHING OF A PORTABLE DEVICE USING A SERIAL BUS HUB

PRIORITY DATA

This application claims benefit of priority to U.S. Provisional Application Ser. No. 61/313,350, titled "Firmware Flashing of Portable Device Using A Serial Bus Hub", filed Mar. 12, 2010, whose inventors are Richard W. Holbrook and Jesse R. Lyles, and which is hereby incorporated by reference in its entirety as though fully and completely set forth herein.

FIELD OF THE INVENTION

The present invention relates generally to the field of equipment manufacture and initialization, and more particularly to use of a serial bus hub, e.g., a Universal Serial Bus (USB) hub, in a portable device (e.g., a cellphone) for maintaining robust signal strength over diverse signal paths in the device, e.g., for flashing the device to initialize or update firmware.

DESCRIPTION OF THE RELATED ART

Many portable (i.e., portable) devices, such as cellphones (including so-called "smart phones"), mp3 players, e-book readers, PDAs (personal digital assistants), and so forth, utilize flash memory, such as NAND flash, to store code for configuration and operation. For example, loading boot code into flash memory is usually the first step in factory testing of a portable product, and may be referred to as "flashing" the product. Boot code is a small amount of software that performs initial startup operations, i.e., that "brings the product up" and allows it to be operational enough to load the product firmware. The programming (flashing) is typically performed in-system using a USB host such as a PC (personal computer or workstation) with code transferred directly into the NAND flash via High-Speed USB after the NAND flash is mounted onto a circuit board of the device.

Figure 1:
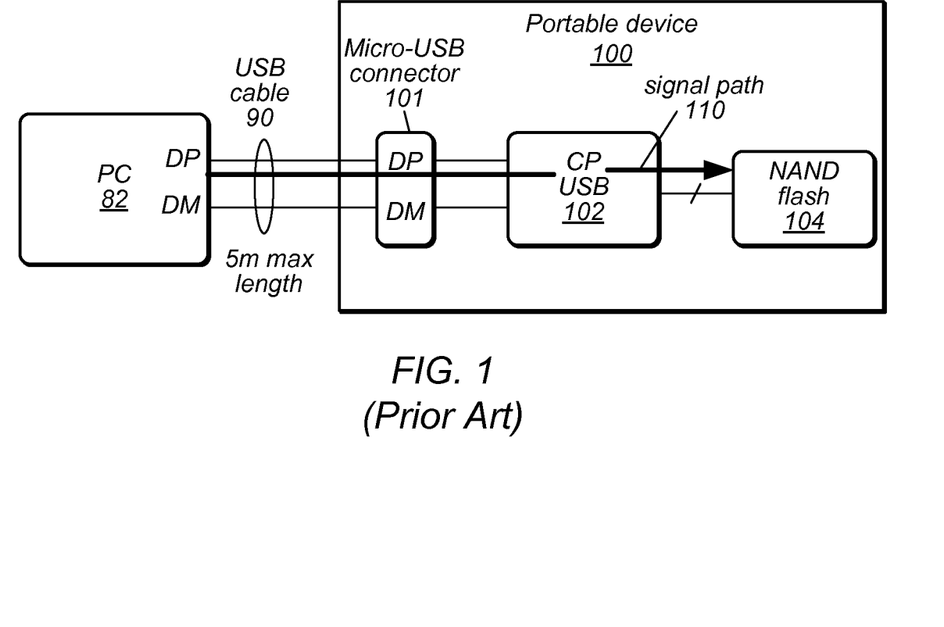
FIG. 1 is a simplified diagram of a prior art system configuration for flashing a portable device.

FIG. 1 is a simplified diagram illustrating a system configuration for product firmware flashing, according to the prior art. As may be seen, a portable device 100 (e.g., a cell phone) that includes a NAND flash (memory) 104, a processor (e.g., a cell processor (CP)) with a USB 102, and a Micro-USB connector 101 is coupled via a USB cable 90 to a PC 82. Note that the terms "DP" and "DM" refer to the well-known USB "data plus" and "data minus". Note further that the USB cables have a maximum length of 5 meters, as indicated. In this exemplary prior art flashing configuration, the PC, which may be mounted in a rack, sends signals over the USB cables to the device, where the processor then configures the NAND flash accordingly. Note that FIG. 1 also shows the signal path leading from the computer to the processor NAND flash.

Customer complaints are common regarding signal integrity issues when flashing a portable device, e.g., a cell phone, in a factory. These issues are primarily due to problems with sharing the USB port in the device (e.g., phone) by using USB switches. These switches are relatively low loss components, but they interface with factory USB cables which may be much longer than cables normally used with the devices due to the programmer equipment (e.g., PC) being located some distance away, e.g., in a test equipment rack, where the programmer equipment flashes many phones at once. The combination of long lossy cables and losses in the USB switch can lead to enough signal loss to cause errors in the programming data (signal). Since this data is the boot code for the device, a bad image can prevent the device from booting, or potentially even cause catastrophic failure ("bricking") of the device. Because the internal USB switches are passive, they cannot provide any gain (amplification) or other signal restoration operations to improve signal path integrity, and so the only option to resolve this issue is to improve performance of the programmer's USB interface or reduce cable length, if possible.

A typical smartphone contains both a wireless chipset with a cell processor (CP) to provide the necessary cellular protocol for the phone and an applications processor (AP) which adds additional processing power for multimedia applications, etc. Both of these processors need to be programmed to bring up the phone in the factory and to present the USB programming interface via a (passive) USB switch.

Figure 2:
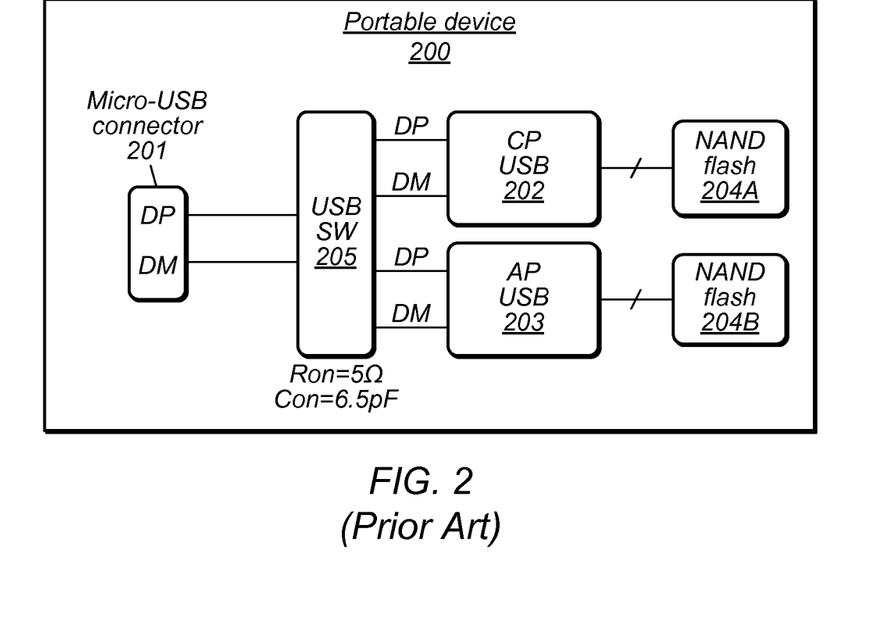
FIGS. 2 and 3 illustrate exemplary portable device configurations, according to the prior art.

FIG. 2 is a diagram of an exemplary hardware configuration of a portable device 200 of this type, where each processor, e.g., cell processor (CP) with USB 202 and application processor (AP) with USB 203, has its own NAND flash (204A and 204B, respectively), and is accessed via a USB switch 205, labeled "USB SW". As may be seen, in this exemplary configuration, the USB switch 205 adds path resistance (5 ohms) and capacitance (6.5 pico-Farads) which increases the signal loss of or in the signal path.

Figure 3:
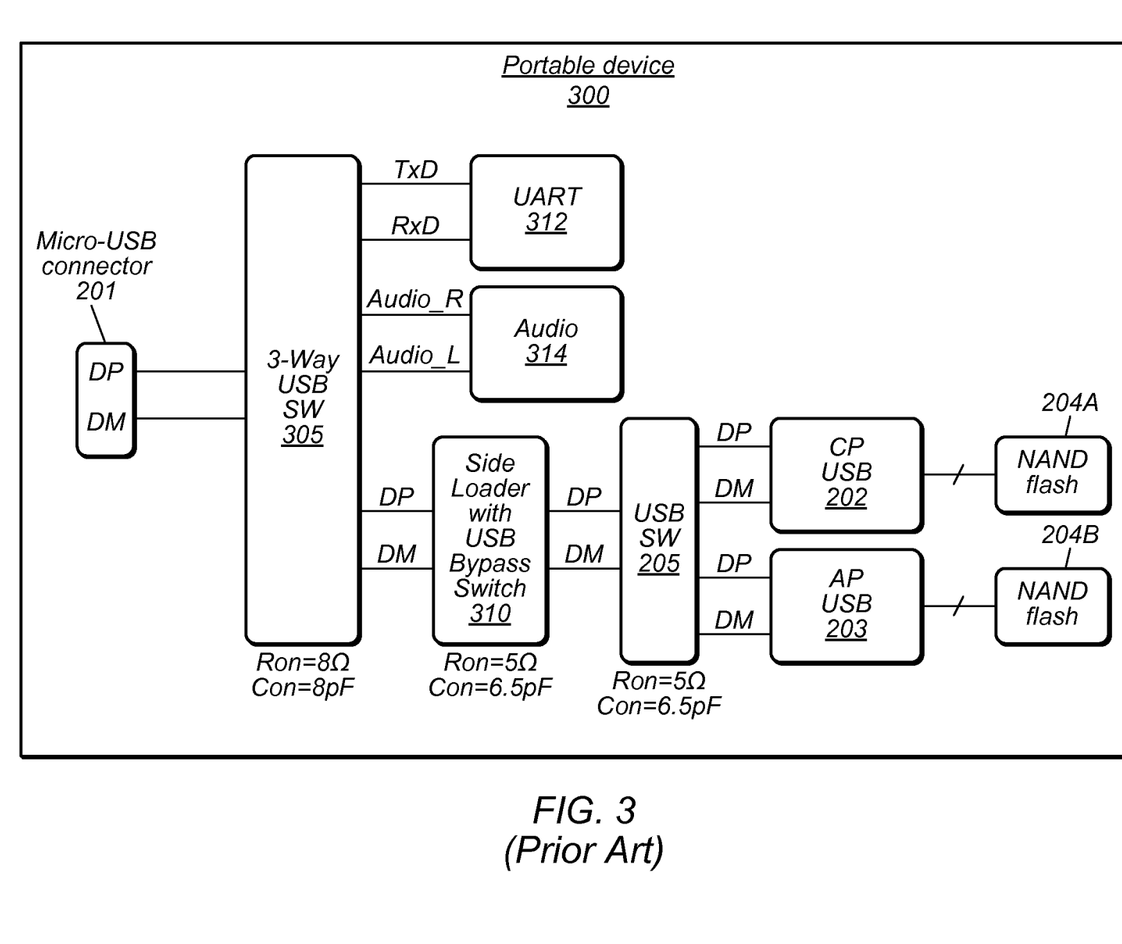

This problem is compounded when the device is a smartphone that includes a 3-way switch for audio and UART (Universal Asynchronous Receiver-Transmitter) connections, as well as a side-loading component, e.g., a sideloader, containing a passive USB switch for internal bypassing. Note that a sideloader is a component whereby content is read from or written to content memory (also referred to as user memory), as opposed to flash memory used to store BIOS code, etc. This type of configuration of a device 300 is illustrated in FIG. 3, where Micro-USB connector 201 provides bus signals to a 3-way USB switch 305, which routes signals to UART 312 and audio circuitry 314, as well as to the sideloader 310, which includes a USB bypass switch. Note further that in this configuration the bypass switch is used to circumvent sideloading circuitry (circuitry implementing the sideloader functionality) of the sideloader 310, allowing rapid communications (read/writes) with flash memory 204A and 204B via CP 202 and AP 203, respectively, by way of the USB switch 205, e.g., for flashing the device 300. Thus, this configuration includes three different USB switches in the signal path from the micro-USB connector to the NAND flash of each processor.

As FIG. 3 shows, these additional components introduce further resistance and capacitance which degrade signal strength, and thus increase the likelihood of errors in the flashing process. The losses introduced by these components are significant in the configuration of FIG. 3.

There has been ongoing work to improve the USB switch signal integrity performance by both raising the bandwidth and lowering the resistance; however, while this approach can improve (decrease) losses introduced by the addition of a USB switch, it cannot improve (decrease) the signal degradation caused by a long cable. Another approach is to use a USB cable extender, but this approach only compensates for cable loss, and is not adjustable. Neither of these approaches addresses the signal degradation issue adequately.

SUMMARY OF THE INVENTION

Various embodiments are presented of a system and method for configuring a portable device, e.g., for flashing a cell phone or other portable device. In one embodiment the portable device is configured with a USB hub, which provides a robust, low loss solution for diverting the USB signal path.

This allows greatly improved USB signal integrity during portable device configuration, e.g., during flashing of boot code for the portable device.

First, a degraded signal may be received to a serial bus hub included in the portable device via a serial bus. The portable device may further include one or more processors coupled to the serial bus hub via the serial bus, and a flash memory coupled to the serial bus hub via the serial bus. The degraded signal may include code (and/or data) to be written to the flash memory to initialize or update firmware for the portable device.

The serial bus hub may restore the degraded signal, thereby generating a restored signal. For example, the serial bus hub may filter and/or amplify the degraded signal to remove noise and/or boost signal strength, among other restoration techniques.

The restored signal may be sent, e.g., by the serial bus hub, to at least one of the one or more processors to initialize or update the firmware in the flash memory for the portable device. For example, the serial bus hub may send the signal to a flash memory interface component configured to read from and write to the flash memory, and the flash memory interface component may write the code (and/or data) to the flash memory, thereby initializing or updating the portable device.

Thus, use of the serial bus hub may provide better system signal integrity for device flashing (i.e., programming) than prior art solutions using a passive (e.g., USB) switch. Moreover, embodiments of the above described solutions can be integrated into the portable product and can be optimized for each product by adjustment during factory calibration.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following describes various exemplary embodiments of a system and method for configuring portable devices with flash memory, e.g., NAND flash, such as cellphones, mp3 players, e-book readers, PDAs, etc. It should be noted that the particular embodiments described are exemplary only, and are not intended to limit the invention to any form, function, architecture, or appearance. For example, while some of the embodiments are described in terms of a USB hub, other buses and hubs may be used as desired. Moreover, as used herein, the term "USB" is intended to cover past, current, and future versions or implementations of USB.

Figure 4:
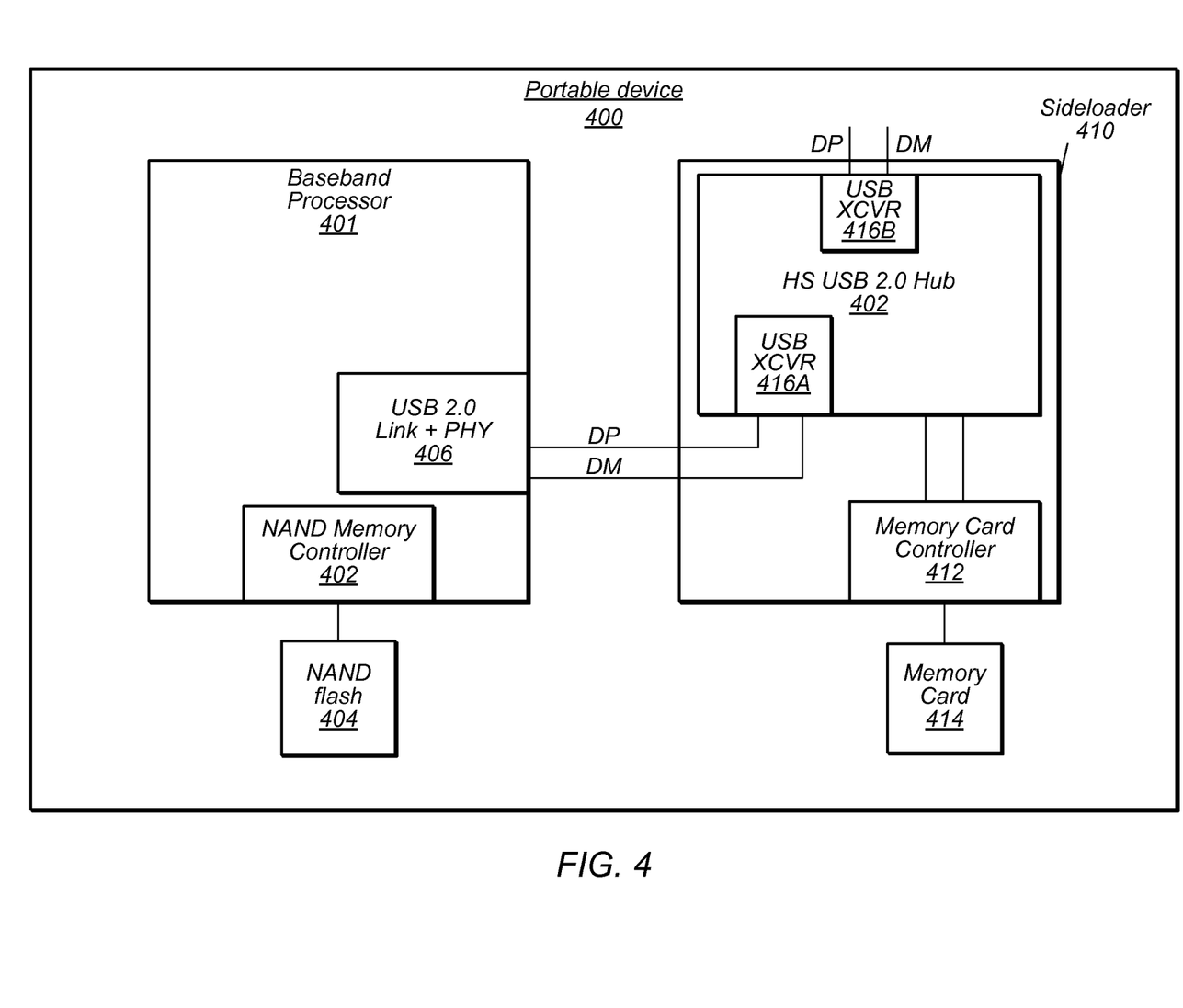
FIG. 4 is a simplified block diagram of an exemplary portable device configured according to one embodiment of the present invention.

FIG. 4—Exemplary Portable Device Configuration

FIG. 4 is a simplified block diagram of an exemplary portable device configuration, according to one embodiment. As FIG. 4 shows, in this exemplary embodiment, a portable device 400 includes a baseband processor 401 which includes a NAND memory controller 402 coupled to a NAND flash memory 404, and further includes a sideloader 410, which includes a serial bus hub 402. As shown, in this embodiment, the processor 401 also includes a USB 2.0 link and physical layer 406 for coupling to the serial bus hub 402, in this case, a high-speed USB 2.0 hub, via USB through USB transceiver 416A, although other types of buses and hubs may be used as desired. Note that in this embodiment, the USB transceiver 416B may be used to access the hub externally. As also shown in FIG. 4, the hub is further coupled to a memory card controller 412 that couples to a memory card 414 (or more generally, user or content memory), e.g., for storing user or content data, e.g., in contrast to device operation or configuration data. Examples of user or content data include telephone numbers, emails, audio or video files, e.g., mp3 or mp4 files, weblinks or pages, text, e.g., ebooks or other documents, games, applications, and so forth, depending on the portable device. In some embodiments content data may also include applications, e.g., games, personal applets, etc. Thus, content memory may be specified and used to store data for or under the control of the user.

As may be seen, in this configuration of the portable device 400, the internal serial bus hub, e.g., USB hub (in this particular case, a USB 2.0 hub), may be used to bypass (and possibly obviate) sideloader circuitry, thus removing that component as a source of signal loss, e.g., in the flashing process. Note that replacing the passive bus switch (e.g., of FIG. 3) with the hub not only removes the passive switch as a signal degradation source, but may provide signal restoration functionality for the device, e.g., active signal processing, such as active filtering, amplification, and so forth.

Figure 5:
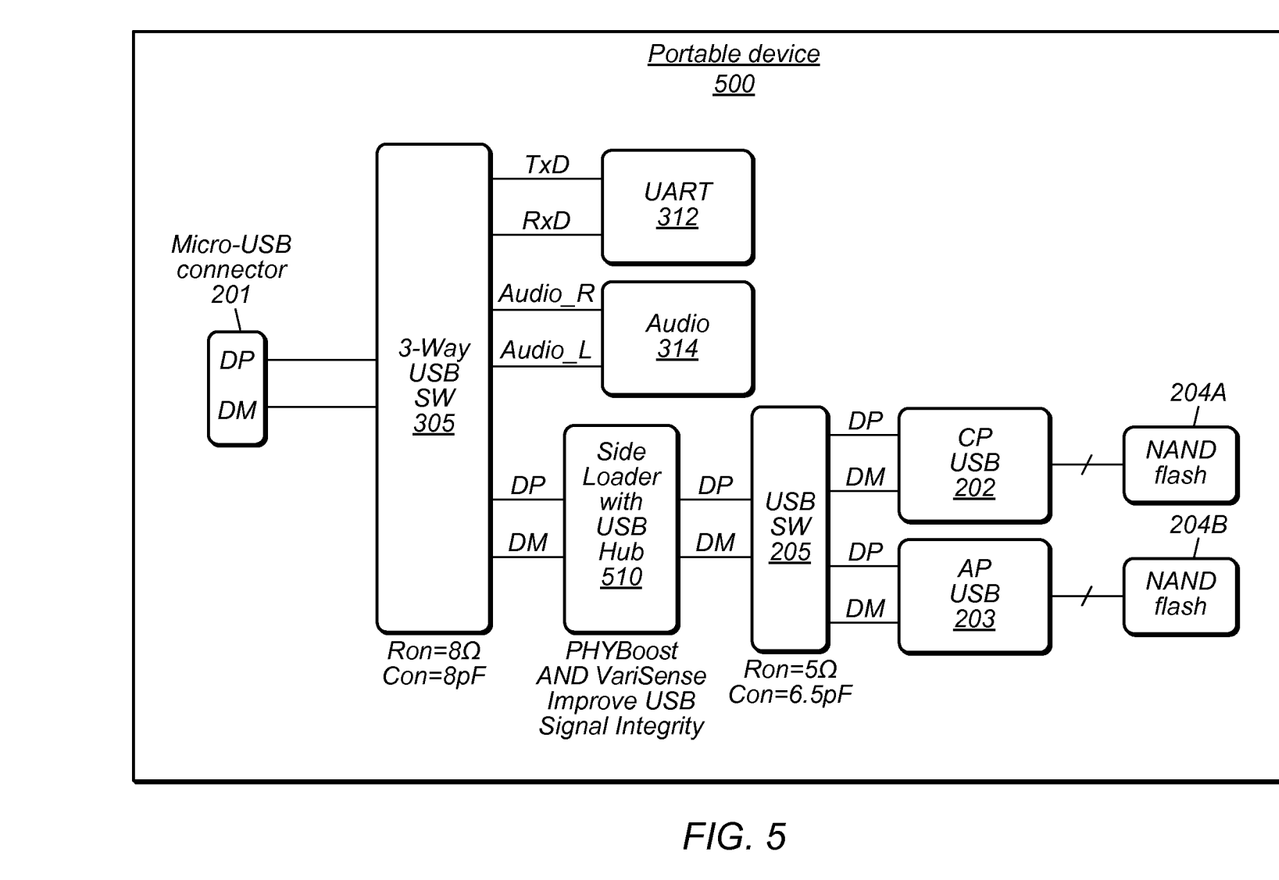
FIG. 5 is a simplified block diagram of an exemplary portable device configured according to one embodiment of the present invention.

FIG. 5—Exemplary Smartphone Configuration

FIG. 5 is a block diagram of an exemplary configuration of a more complex portable device 500, e.g., a smartphone, according to one embodiment. As shown, in this configuration, the device 500 includes both a cell processor (CP with USB support) 202 and an applications processor (AP with USB support) 203, each with its own NAND flash 204 (A and B, respectively). These processors are coupled to passive USB switch 205, which is in turn coupled to a side loader 510, which includes a USB hub (which could also be some other type of serial bus hub). Note that, in contrast with the prior art configuration of FIG. 3, the passive USB switch in the side loader has been replaced with the hub, thus, removing the passive switch as a signal degradation source, and providing signal restoration functionality for the device. As also shown, in this exemplary configuration, the side loader 510 is also coupled to a 3-way USB switch 305, which further couples to UART and audio connections or components of the device (312 and 314, respectively), as well as a micro-USB connector 201, e.g., for communications with a computer or other data source.

As may be seen, much like the configuration of FIG. 3, any signal degradation due to resistance and capacitance of the various USB switches components may be ameliorated, prevented, or even reversed, by the serial bus hub. In other words, embodiments of this solution may significantly improve signal integrity by using an active USB hub in the sideloader instead of the passive USB switch of the prior art solution (see, e.g., FIG. 3). More specifically, USB transceivers integrated into the USB hub effectively regenerate the USB signals at each port of the hub. This restores the signals to their optimum level and more than makes up for the losses on either side of the (sideloader) component. In one embodiment, the hub may further include additional functionality, such as PHYBoost and VariSense technologies, provided by SMSC, which may facilitate system control of both the transmitted and received USB signals and allow for fine tuning of the signal levels.

Figure 6:
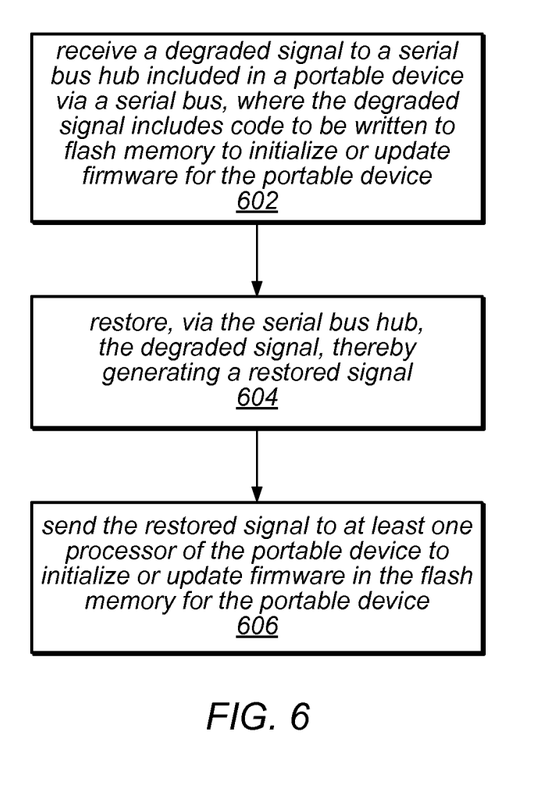
FIG. 6 is a flowchart diagram illustrating one embodiment of a method for configuring a portable device, according to one embodiment.

FIG. 6—Flowchart of a Method for Configuring a Portable Device

FIG. 6 is a flowchart diagram illustrating one embodiment of a method for configuring a portable device, e.g., flashing a cellphone, according to one embodiment. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a degraded signal may be received to a serial bus hub included in the portable device via a serial bus. The portable device may further include one or more processors coupled to the serial bus hub via the serial bus, and a flash memory coupled to the serial bus hub via the serial bus. The degraded signal may include code (and/or data) to be written to the flash memory to initialize or update firmware for the portable device.

In 604, the serial bus hub may restore the degraded signal, thereby generating a restored signal. For example, the serial bus hub may filter and/or amplify the degraded signal to remove noise and/or boost signal strength, among other restoration techniques.

The portable device may also include system circuitry for performing various system functions for the portable device, e.g., basic operations of the device, including, for example, signal routing or configuration. As indicated above, in some embodiments, the serial bus hub may be programmed or otherwise configured, e.g., via PHYBOOST or VARISENSE functionality (or functionally similar products or elements) by the system circuitry to control transmitted and received signals on the serial bus, including fine tuning signal levels. Thus, the restoring may be programmably tuned as desired, thereby providing flexibility and even customizability. For example, as part of, or in addition to, the flashing process whereby the portable device is initially configured, the serial bus hub may be programmed or configured to perform in a manner specific to the particular device, device model or class, etc. Alternatively, or additionally, the system circuitry (possibly in response to user input or input from an external agent) may program or configure the serial bus hub dynamically, e.g., after purchase, and possibly even during operation.

In 606, the restored signal may be sent, e.g., by the serial bus hub, to at least one of the one or more processors to initialize or update the firmware in the flash memory for the portable device. For example, the serial bus hub may send the signal to a flash memory interface component configured to read from and write to the flash memory, and the flash memory interface component may write the code (and/or data) to the flash memory, thereby initializing or updating the portable device. Thus, in one embodiment, the above receiving, restoring, and sending, may be performed in a device flashing process.

Further embodiments of the above-described method (and portable device) are discussed below.

Figure 7:
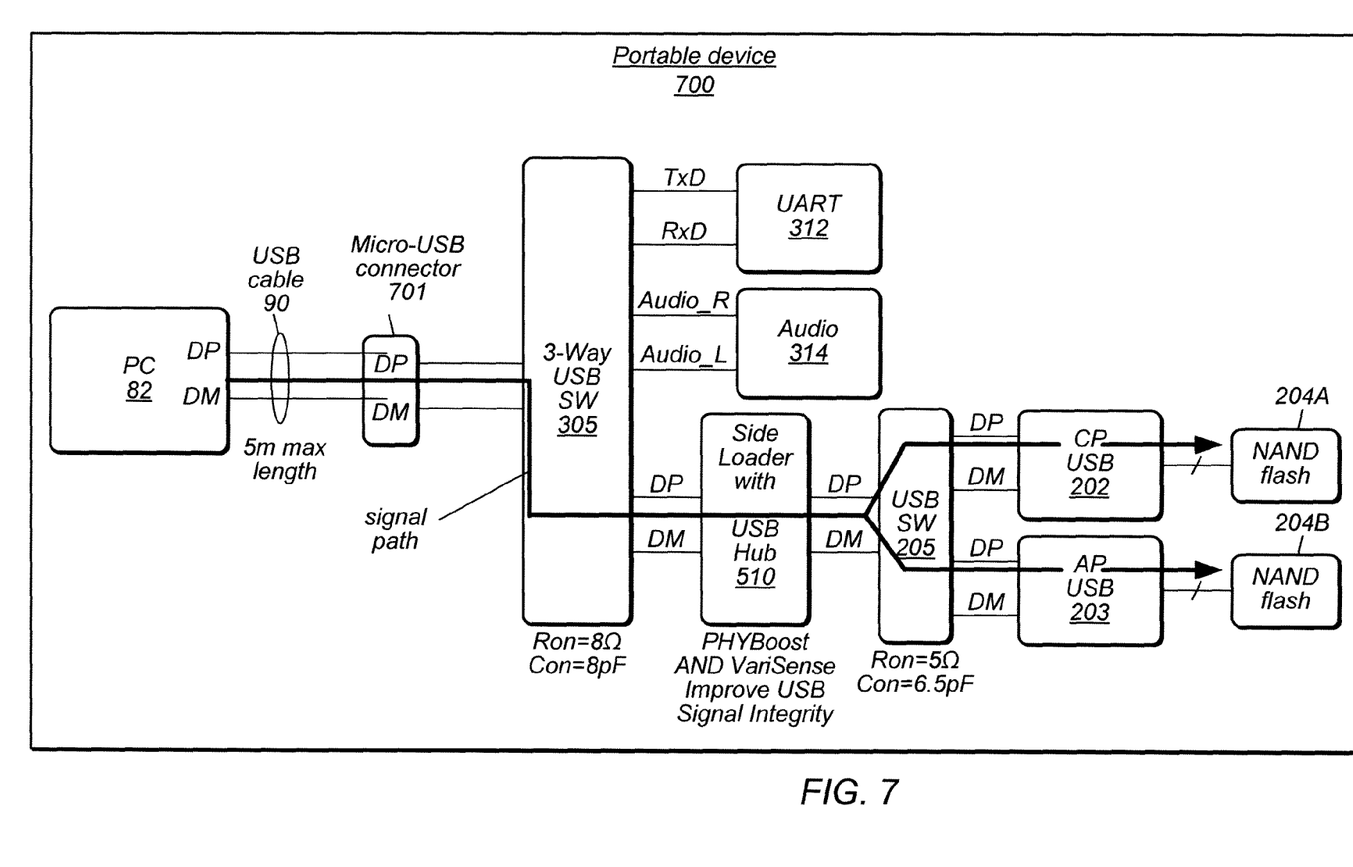
FIG. 7 is a simplified diagram of a system configuration for flashing a portable device, according to one embodiment.

FIG. 7—Simplified Diagram of Exemplary System for Configuring a Portable Device

FIG. 7 is a simplified diagram illustrating an exemplary system configuration for product firmware flashing, e.g., boot loading, according to one embodiment. As shown, a portable device 700 (e.g., cellphone) is configured according to the diagram of FIG. 5, e.g., where, as in FIG. 5, the portable device includes a 3-way USB switch 305, UART and audio connections (or components) 312 and 314, respectively, a side loader 510 that includes a USB hub, which is coupled via a USB switch 205 to cell and application processors (202 and 203) with respective NAND flash (204A and 204B). The portable device 700 is coupled to a computer (e.g., a PC) 82 via a USB cable 90, and is thus programmable (flashable) by the computer to initialize or update firmware in the NAND flash of either or both processors. Note that FIG. 7 also shows the signal path leading from the computer to each of the processor NAND flashes, indicated by the dark line segment with arrow(s).

Thus, use of the serial bus hub may provide better system signal integrity for device flashing (i.e., programming/configuring) than prior art solutions using a passive (e.g., USB) switch. Moreover, embodiments of the above described solutions can be integrated into the portable product and can be optimized for each product by adjustment during factory calibration.

Further Embodiments

It should be noted that the embodiments described above are intended to be exemplary only, and are not intended to limit the invention to any particular form, function, architecture, or appearance.

For example, in some embodiments, the portable device may include a content memory coupled to the one or more processors, where the content memory is configured to store content data. The device may further include a sideloader coupled to the content memory, where the sideloader includes sideloading circuitry configured to write directly to content memory. The above receiving, restoring, and sending, may include the serial bus hub bypasses the sideloading circuitry. In other words, the serial bus hub may be configured to bypass the sideloading circuitry, thereby removing the sideloading circuitry as a source for signal degradation. As mentioned above, in some embodiments, the serial bus hub may be included in the sideloader. Thus, the sideloader may include functionality for bypassing its own functional circuitry (i.e., sideloading circuitry). Alternatively, in other embodiments, the serial bus hub may not be included in a side loader, and in fact, the portable device may not include a sideloader at all.

In yet further embodiments, the serial bus hub may be available for general use by the rest of the portable device, i.e., may serve as a central signal routing hub for the portable device. In some of these embodiments, the hub may operate to maintain signal strength and integrity for substantially all signals in the device.

In one embodiment, the serial bus hub may be or include an active hub with a plurality of ports, and restoring the degraded signal may include regenerating the bus signals at each port of the hub. In other words, the serial bus hub may be configured to boost or amplify the signal or portions thereof, e.g., may include an active signal filter and/or other active signal processing functionality.

As noted above, in various embodiments, the above techniques may be implemented with respect to any of a wide variety of portable devices, including, for example (but not limited to), a cell phone, a smart phone, a personal digital assistant, a digital audio player, a tablet computer, or an e-book reader, among others.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring a portable handheld device, wherein the portable device comprises:
   a sideloader having sideloading circuitry and further comprising a USB bus hub with an external USB interface operable to couple the portable handheld device with an external host,
   one or more processors having a USB interface coupled to an internal USB interface of the USB bus hub of the sideloader, wherein the one or more processor is coupled with a flash memory;
   the method comprising:
   receiving a degraded signal by the sideloader, wherein the USB bus hub is controlled to bypass sideloader circuitry coupling the external USB interface with the USB interface of one of the one or more processors,
   wherein the degraded signal comprises code to be written to the flash memory to initialize or update firmware for the portable handheld device;
   restoring, via the serial bus hub, the degraded signal, thereby generating a restored signal; and
   sending the restored signal to at least one of the one or more processors to initialize or update the firmware in the flash memory for the portable handheld device.

2. The method of claim 1, wherein the USB bus hub comprises a plurality of internal USB interfaces.

3. The method of claim 1, wherein the flash memory comprises NAND flash.

4. The method of claim 1, wherein the portable handheld device further comprises:
   a content memory, coupled to the serial hub, wherein the content memory is configured to store content data,
   wherein the sideloading circuitry is configured to write directly to the content memory.

5. The method of claim 1, wherein the portable handheld device comprises multiple processors, each processor being connected with an associated flash memory.

6. The method of claim 1, wherein the serial bus hub comprises an active hub with a plurality of ports, wherein said restoring comprises regenerating the bus signals at each port of the hub.

7. The method of claim 1, wherein the portable handheld device further comprises system circuitry for performing system functions for the portable handheld device, the method further comprising:
   the system circuitry programming the serial bus hub to control transmitted and received signals on the serial bus, including fine tuning signal levels.

8. The method of claim 1, wherein the portable handheld device comprises one or more of:
   a cell phone;
   a smart phone;
   a personal digital assistant;
   a digital audio player;
   a tablet computer; or
   an e-book reader.

9. The method of claim 1, further comprising:
   the portable handheld device using the serial bus hub as a central routing hub for the portable handheld device.

10. The method of claim 1, wherein said receiving, restoring, and sending, is performed in a device flashing process.

11. A portable handheld device, comprising:
    a sideloader with sideloading circuitry comprising a USB bus hub with an external USB interface operable to receive and transmit data via the external USB interface;
    one or more processors coupled to the USB bus hub via an internal USB bus; and
    at least one flash memory coupled to one of the one or more processors;
    wherein the serial bus hub is configured to:
    receive through the external USB interface a degraded signal comprising code to be written to the flash memory to initialize or update firmware for the portable handheld device,
    restore the degraded signal, thereby generating a restored signal; and
    send the restored signal directly to at least one of the one or more processors via the internal USB bus thereby bypassing the sideloading circuitry to initialize or update the firmware in the flash memory for the portable handheld device.

12. The portable handheld device of claim 11, wherein the USB bus hub comprises a plurality of internal USB interfaces.

13. The portable handheld device of claim 11, wherein the flash memory comprises NAND flash.

14. The portable handheld device of claim 11, wherein the portable handheld device further comprises:
    a content memory, coupled to the USB bus hub, wherein the content memory is configured to store content data; and
    wherein the sideloading circuitry is configured to write directly to the content memory.

15. The portable handheld device of claim 14, comprising multiple processors, each processor being connected with an associated flash memory.

16. The portable handheld device of claim 11, wherein the serial bus hub comprises an active hub with a plurality of ports, and wherein to restore the degraded signal, the serial bus hub regenerates the bus signals at each port of the hub.

17. The portable handheld device of claim 11, wherein the portable handheld device further comprises system circuitry for performing system functions for the portable handheld device, wherein the system circuitry is configured to program the serial bus hub to control transmitted and received signals on the serial bus, including fine tuning signal levels.

18. The portable handheld device of claim 11, wherein the portable device comprises one or more of:
    a cell phone;
    a smart phone;
    a personal digital assistant;
    a digital audio player;
    a tablet computer; or
    an e-book reader.

19. The portable handheld device of claim 11, the serial bus hub is configured as a central routing hub for the portable handheld device.

20. The portable device of claim 11, wherein said receiving, restoring, and sending, is performed in a device flashing process.

\* \* \* \* \*